United States Patent [19]

Baze

[11] Patent Number: 5,628,245

[45] Date of Patent: May 13, 1997

[54] UTENSIL FOR FORMING TORTILLAS INTO BAKED TACO SHELLS

[76] Inventor: Mark E. Baze, 1070 Noriega Ave. #9, Sunnyvale, Calif. 94086

[21] Appl. No.: 320,700

[22] Filed: Oct. 11, 1994

[51] Int. Cl.⁶ .................................................. A47J 37/01
[52] U.S. Cl. .................. 99/426; 99/400; 99/425; 99/441; 99/445; 99/450; 249/120
[58] Field of Search ............................. 99/426, 427, 450; 211/13, 41, 60.1; 425/470, 472, 403; 248/174; 249/120, 119

[56] References Cited

U.S. PATENT DOCUMENTS

| | | | |
|---|---|---|---|
| 124,296 | 3/1872 | Smith | 99/450 X |
| 2,570,374 | 10/1951 | Pompa | 99/426 |
| 3,511,172 | 5/1970 | Jones | 99/426 |
| 3,693,537 | 9/1972 | Johnson et al. | 99/426 |
| 4,004,501 | 1/1977 | Guerrero | 99/426 |
| 4,394,410 | 7/1983 | Osrow et al. | 99/446 |
| 4,974,502 | 12/1990 | Murdock | 99/426 |

FOREIGN PATENT DOCUMENTS 2466197  4/1981  France ..................................... 99/448

*Primary Examiner*—Timothy F. Simone

[57] ABSTRACT

An apparatus for forming tortillas into baked, oil-free taco shells. The invention may also be used to retain the shape of commercially prepared pre-formed fried taco shells during their reheating, and to hold baked or reheated taco shells during their filling and serving. The apparatus has a series of linear, parallel spaced crests in the shape of inverted, round bottomed "V"s, with such dimensions as to make a form corresponding to an inverted, taco shell shape. The crests have a plurality of perforations to allow for a uniform and rapid forming and baking of the tortillas upon the crests.

2 Claims, 1 Drawing Sheet

UTENSIL FOR FORMING TORTILLAS INTO BAKED TACO SHELLS

TECHNICAL FIELD

This invention relates to cooking apparatus, specifically to an apparatus for forming tortillas into baked, oil-free taco shells. The invention may also be used for the reheating of commercially prepared preformed fried taco shells, and for holding and filling baked or reheated taco shells.

BACKGROUND ART

Taco shells, and the related tortilla "chips," have traditionally been prepared by forming and frying tortillas in a vat or skillet of oil. More recently, in response to the public's increased awareness of the benefits to be obtained from eating foods lower in fat, manufacturers have begun offering tortilla chips that are baked rather than fried. A natural extension of this health consciousness is to likewise prepare tacos using a baked, oil-free taco shell.

Baked taco shells may be prepared by draping tortillas over two adjacent wires of the type of wire rack present in a standard kitchen oven and then baking, during which time the tortillas initially become limp and hang down, and then eventually become crisp. However, this method produces a malformed taco shell, and one in which the opening of the taco shell through which various finely cut foods are placed is partially or completely closed due to an excessive curling of the tortilla that takes place during the baking process. In addition, removal of the baked taco shells from the oven is extremely awkward, causing breakage of the shells and burning of one's hands.

A number of utensils or apparatus have been proposed in the past that serve to form tortillas into the characteristic "V"-shaped taco shell during a cooking process. Examples are shown in U.S. Pat. Nos. 3,511,172 to Jones (1970) and 3,693,537 to Johnson and Henderson (1972). However, all of these devices are designed and intended to be used to produce fried as opposed to baked taco shells.

Other utensils, similar in shape to the invention presented here, have been designed as taco holders for the filling and serving of tacos. An example is shown in U.S. Pat. No. 4,004,501 to Guerrero (1977). However, Guerrero's device is not intended to act as a form upon which to prepare baked taco shells from tortillas, nor would it be suitable for this purpose since the height of the trough walls that comprise Guerrero's device is not great enough to permit a tortilla to hang in the free manner necessary to allow for creation of the traditional "V"-shaped taco shell shape during a baking process. In addition, the device does not contain perforations to allow for a uniform and rapid forming and baking of tortillas into taco shells.

U.S. Pat. No. 4,974,502 to Murdock (1990) describes a combination apparatus for "baking" and serving fried taco shells in which the shells are placed between parallel, horizontal rods in an upright position for their reheating and filling. Again, this device is not intended nor would it be suitable for preparing oil-free baked taco shells since excessive curling of a tortilla would occur should an attempt be made to use it for that purpose. Indeed, the design even allows for the possibility of some curling during the reheating of the pre-formed fried taco shells for which its use is intended. In addition, its design makes its construction more complex than is necessary and it is awkward to clean.

DISCLOSURE OF INVENTION

Accordingly, several objects and advantages of the present invention are:

(a) to provide for an apparatus for use in the forming of tortillas into baked, oil-free or "lower-fat" taco shells;

(b) to provide for an apparatus for use in the preparation of baked taco shells in order to obtain the health benefits of a baked rather than fried food product;

(c) to provide for an apparatus for use in the preparation of baked taco shells from tortillas at a cost to the consumer that is much less than that of commercially available preformed fried taco shells;

(d) to provide for an apparatus for use in the preparation of baked taco shells that allows for a uniform and rapid baking of the tortillas from which such shells are made;

(e) to provide for an apparatus as above that may also be used to reheat commercially available pre-formed fried taco shells while causing such shells to retain their original form as nearly as possible;

(f) to provide for an apparatus as above that may also be used to hold and fill baked or reheated tacos;

(g) to provide for a cooking apparatus that is safe and easy to handle and which can be cleaned with a minimum of time and effort;

(h) to provide for a cooking apparatus that is conformable for use in domestic or commercial cooking applications; and (i) to provide for a cooking apparatus that is of a relatively simple construction and which can be easily and economically manufactured.

Briefly, a preferred embodiment of the present invention is a cooking utensil for forming tortillas into baked, oil-free taco shells and for holding such shells for filling. The cooking utensil is in the form of a highly corrugated, continuous metal sheet having crests and troughs and containing a plurality of perforations. The corrugations of the cooking utensil closely correspond to the shape of a traditional taco shell. Preparing baked taco shells is simple, requiring only that soft tortillas be draped over the crests with the edges of the tortillas inserted between the crests and pointed down into the troughs. The tortilla-containing utensil is then placed in an oven and the tortillas baked for approximately ten minutes. Upon removal from the oven, the shells are conveniently inverted and placed between the crests for filling, the crests being uniformly spaced to support taco shells in the upright position.

Still further objects and advantages of my invention will become apparent from a consideration of the drawings and ensuing description.

BEST MODE FOR CARRYING OUT THE INVENTION

Figure 1:
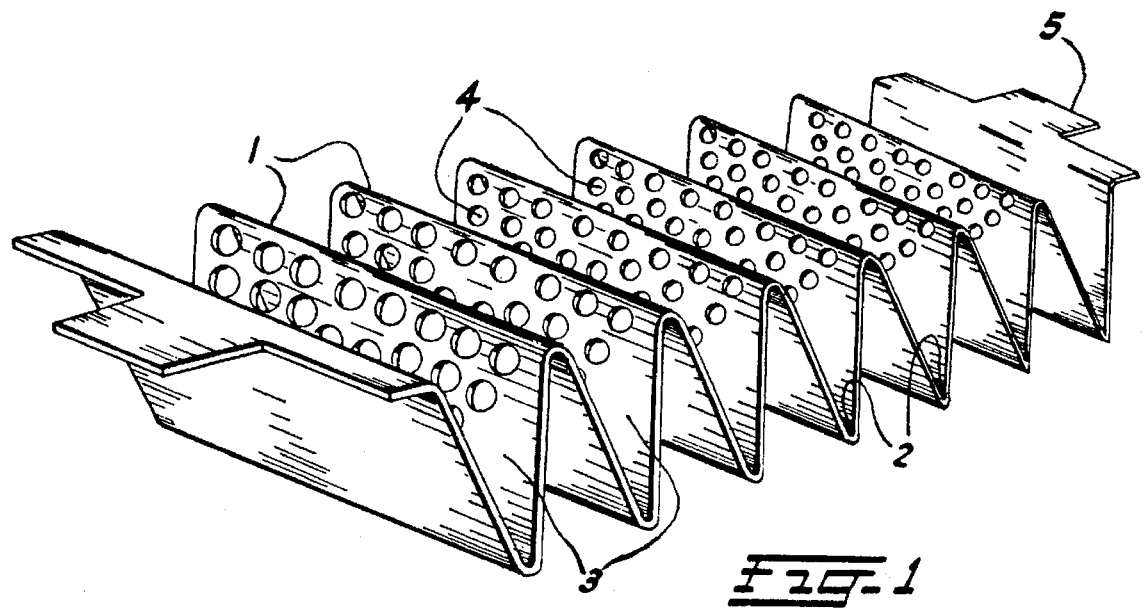
FIG. 1 is a perspective view of a preferred embodiment of my apparatus for forming and baking, reheating, and filling taco shells.
Figure 2:
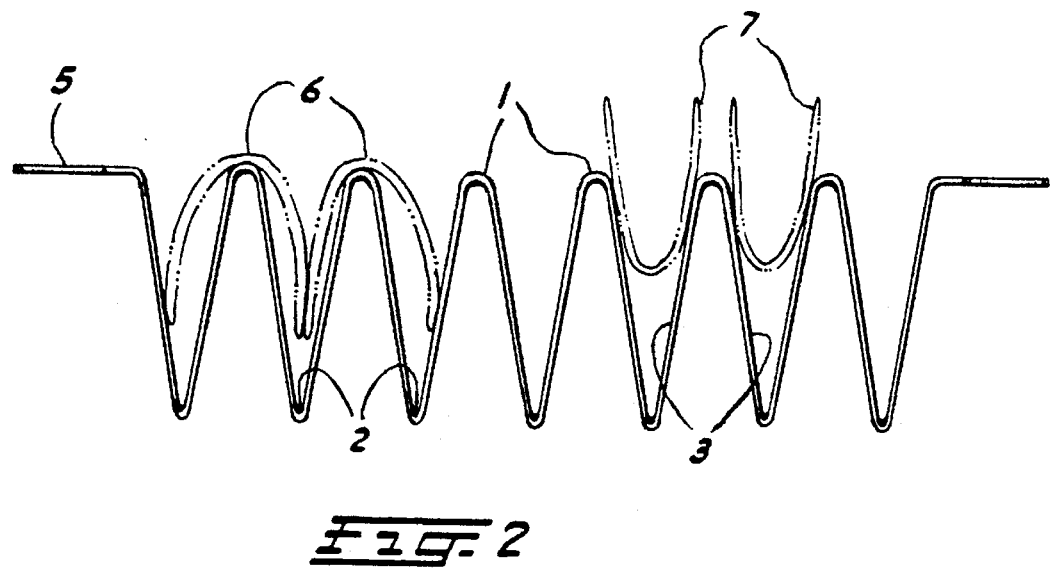
FIG. 2 is a side elevational view of the preferred form in which, at the left side of the figure, two phantom tortillas have been placed in the flexed position they assume preparatory to baking, and at the right side of the figure, two phantom baked taco shells have been placed in an upright position preparatory to filling.

In a preferred embodiment of my apparatus as shown in the drawings, crests 1 for forming six taco shells from tortillas 6 during a baking process are arranged as a series of linear transverse corrugations across most of the length of the apparatus which is formed from a single sheet of aluminum alloy metal. These crests 1 are of such a height that when a commercially prepared tortilla 6, which typically has a diameter of about 6 to 7 inches (15 to 18 cm), is placed upon a crest 1 and becomes limp during the baking process prior to becoming crisp, the tortilla's edges hanging down to each side of the crest 1 will not make contact with the bottoms of valleys 2 running in parallel relation between the crests 1. Too substantial a contact would prevent a proper molding of the tortilla onto the taco shell form as presented by the crests 1 and inclined walls 3. A crest height of 4 inches (10 cm) would normally be sufficient. The crests 1 are of a length that is at least as great as the diameter of a commercially prepared tortilla. The angle at which the walls 3 of each crest are positioned, together with the radius of the curvature at the top of each crest 1, are that which correspond substantially to the bending radius and included angle found in an inverted, commercially available, pre-formed fried taco shell such as LAWRY'S (™). The included angle of the forming crests 1 are thus on the order of approximately 20 degrees. The crests 1 are spaced at such a distance as will allow a taco shell placed between two adjacent crests 1 to be supported by the walls 3 of the crests while being suspended high enough above the underlying valley 2 such that the top edges of the taco shell will be above the tops of crests 1 to allow for easy removal of the filled taco shell. This spacing distance is approximately 2 inches (5 cm). The crests 1 and walls 3 contain a plurality of perforations 4. The perforations 4 should not be so large or so shaped or so situated as to enable a tortilla to intrude into the perforations 4 during the baking process and thereby produce a distorted taco shell. The pattern presented by the perforations 4 should preferably be uniform and cover all of the surface area covered by a tortilla. At each end of the apparatus as shown is a handle 5.

The preferred cooking utensil is formed from any number of aluminum alloys suitable for baking and well known to those with ordinary skill in the art. The subject device may also be made out of other heat resistant materials including, but not limited to, stainless steel and oven resistant ceramics. In addition, the invention might be coated with any of a variety of "non-stick" surface materials including, but not limited to, SILVERSTONE (™).

It is to be understood that various modifications and changes may be made in the exact construction and arrangement of the elements as described without departing from the invention. For example, the number of crests in the invention might be increased or decreased, or the length of the crests might be increased to accommodate more than one tortilla or taco shell at a time, or the perforation pattern might not be that of the uniform and symmetrical pattern depicted but rather some artistic design such as a pattern that resembles an ear of corn. Accordingly, the above disclosure is not to be considered as limiting and the appended claims are to be interpreted as encompassing the entire spirit and scope of the invention.

INDUSTRIAL APPLICABILITY

The manner of using the invention to bake tortillas into taco shells is quite simple. Commercially available or freshly prepared tortillas 6 are centered upon the crests 1, and the edges of such tortillas 6 are tucked downwards toward the valleys 2 together with the edges of a neighboring tortilla 6, if present. When the apparatus is put into a pre-heated oven, the tortillas 6 initially become quite limp due to the heating of the moisture they contain and they conform themselves to the shape of the crests 1 and the walls 3 of the crests. Upon further baking the tortillas 6 become rigid and crisp and are thus formed into baked, oil-free taco shells 7. The taco shells 7 may then conveniently be inverted and placed between the walls 3 of the crests to be filled with the various fillings traditionally used by those experienced in the art, such as spiced beef, tomatoes, lettuce and cheese.

A typical methodology for baking commercially available, preservative-free corn tortillas into taco shells is as follows. The invention made of aluminum, and containing the tortillas positioned as above, is placed at about middle height of a standard kitchen oven pre-heated to 350° F. and the tortillas are baked for approximately 8 to 10 minutes. It is important that the tortillas be at room temperature prior to the baking process in order to avoid splintering of their shells. Thus, if the tortillas have been placed in a freezer or refrigerator for storage purposes, they should be allowed to warm completely to room temperature prior to baking. Such tortillas may also receive a light coating of oil prior to the baking process in order to enhance their flavor and thereby produce a "lower-fat" taco shell.

An additional manner of using the invention is in the reheating of commercially prepared preformed fried taco shells. Such shells are inverted and placed upon the baking crests 1 and reheated for the approximate time and temperature as recommended by the manufacturer. In this way, fried taco shells may be reheated more conveniently and with less distortion than sometimes occurs from simply reheating them on a cookie sheet.

Thus, the reader will see that my invention offers for the first time a convenient and simple device for the preparation of delicious baked, oil-free taco shells that are properly formed. The device may also serve as an apparatus for reheating fried taco shells and for holding baked or reheated taco shells during their filling. For the objects and advantages given above, it is expected that the industrial applicability and commercial utility of the present invention will be extensive and long lasting.

I claim:

1. A utensil of unitary construction for forming tortillas into baked taco shells and for supporting taco shells for filling and for reheating commercially prepared pre-formed fried taco shells, comprising:

a plurality of perforated crests, each said perforated crest having a radius of curvature as does substantially correspond to the bending radius of a commercially available fried taco shell;

at least one valley, each said valley being interposed between each said perforated crest and running in parallel relation thereto; and a plurality of perforated walls, each said perforated wall connecting a said perforated crest and a said valley in continuous integral fashion, any two adjacent said perforated walls further defining an included angle as does substantially correspond to the included angle of a commercially available fried taco shell, said perforated walls further being uniformly spaced to supportably hold an upright taco shell.

2. The utensil of claim 1 formed of aluminum alloy.

* * * * *